Sept. 7, 1965    R. N. SHANAHAN ETAL    3,204,713
AMPHIBIOUS MOTOR VEHICLE
Filed April 16, 1963    3 Sheets-Sheet 1
FIG. 1.
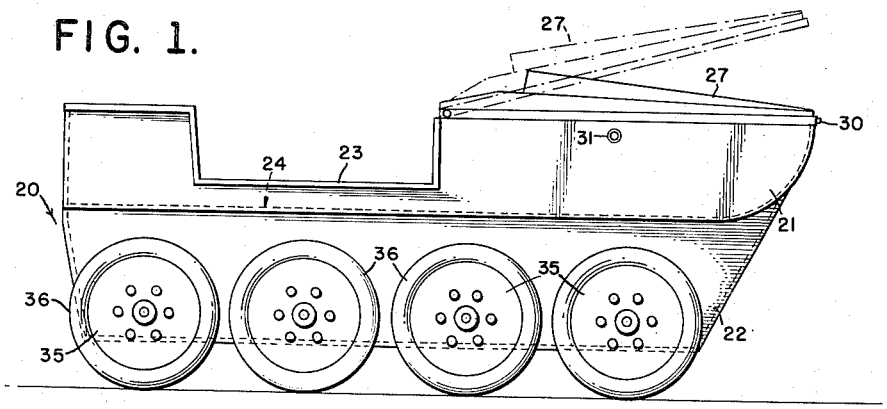
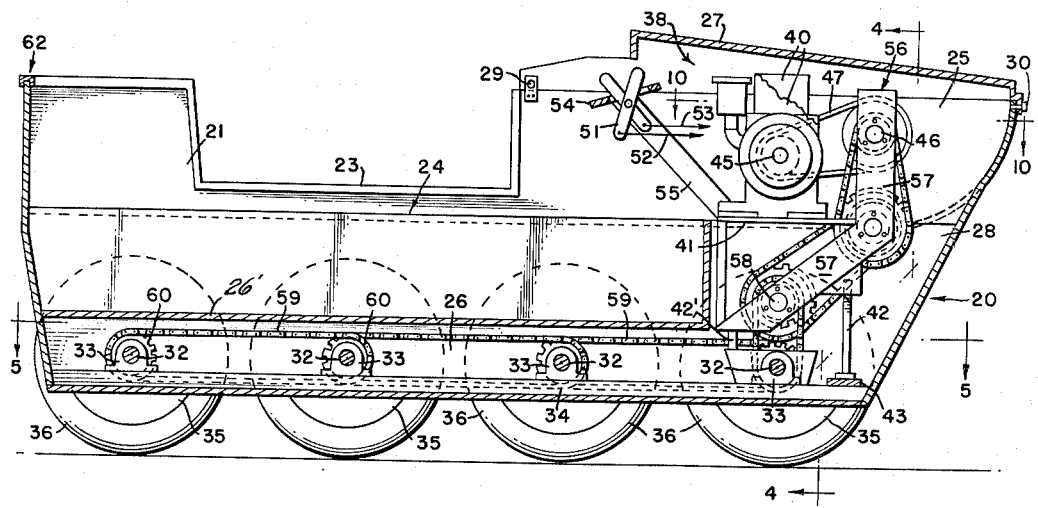
FIG. 3.
FIG. 4.
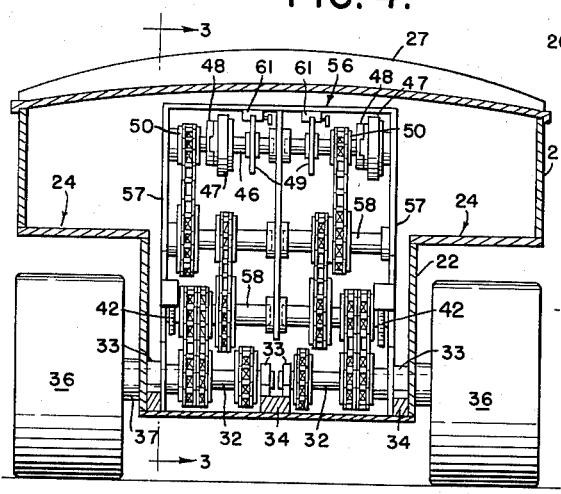
FIG. 2.
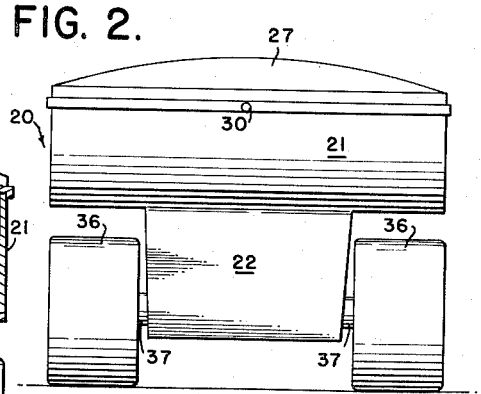
INVENTORS
ROBERT N. SHANAHAN
HOWARD M. FALTIN
BY DONALD K. PORTER
Garney & Garney
ATTORNEYS

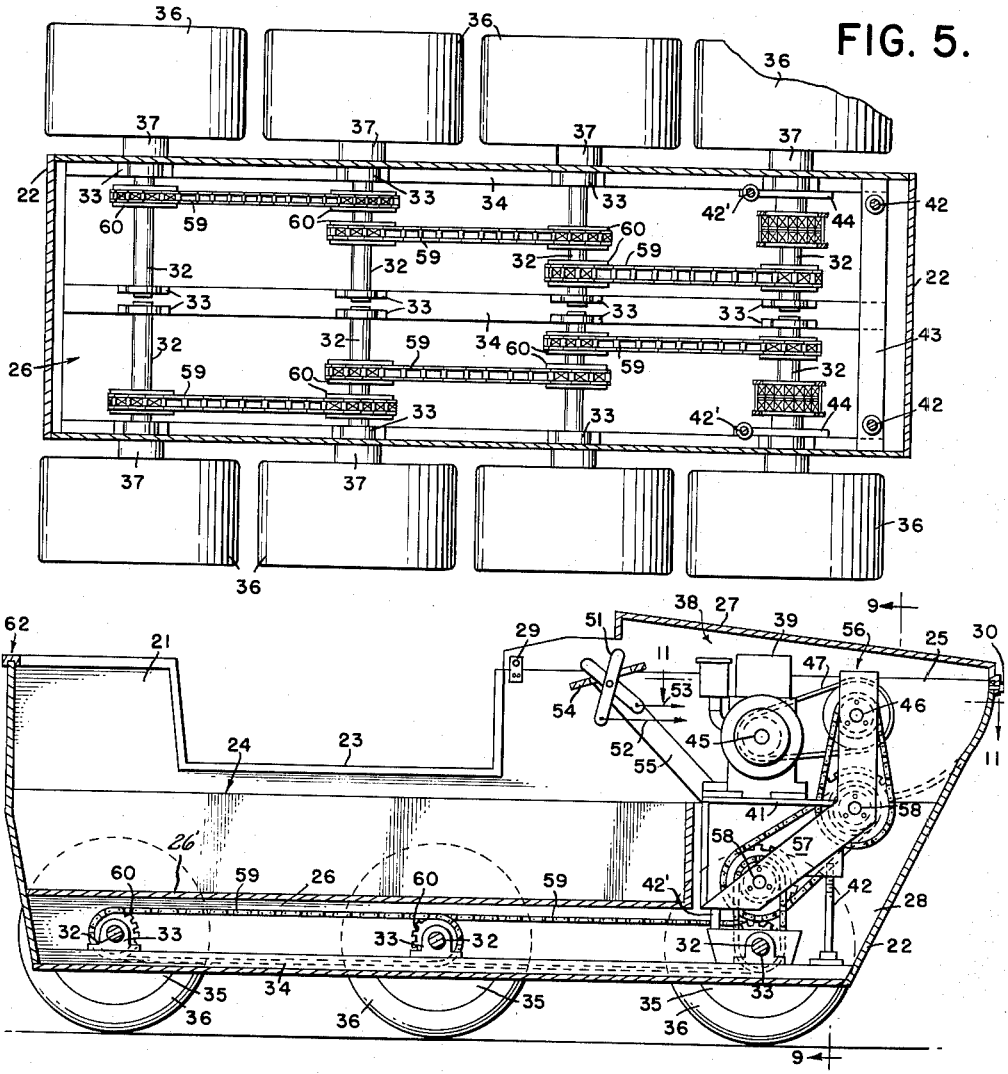

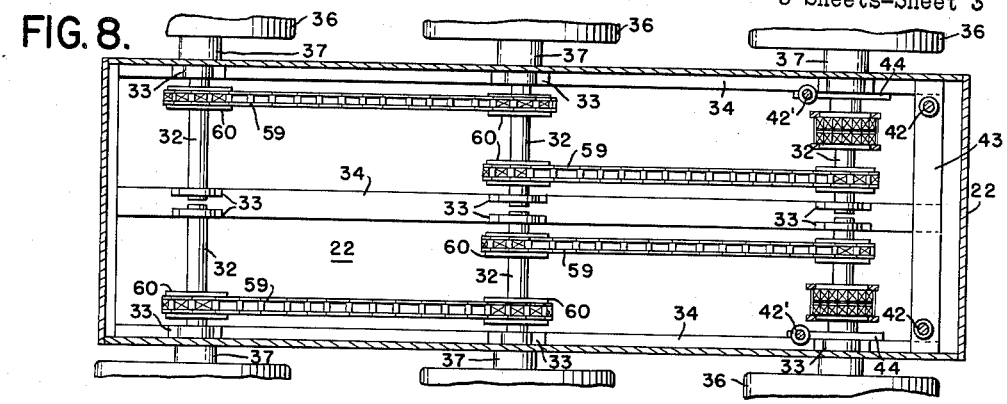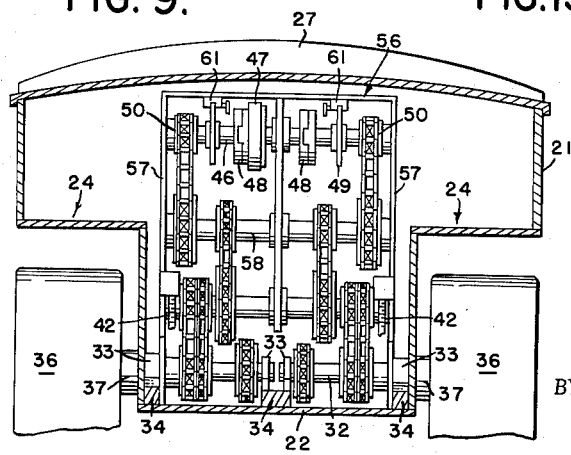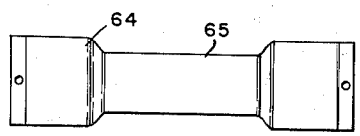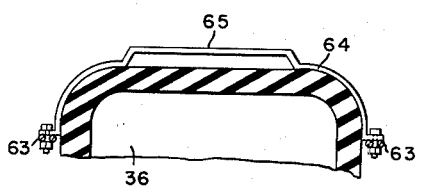

3,204,713
AMPHIBIOUS MOTOR VEHICLE
Robert N. Shanahan, Howard M. Faltin, and Donald K. Porter, Spenard, Alaska, assignors to Trail Mate Corporation of Alaska, Spenard, Alaska
Filed Apr. 16, 1963, Ser. No. 273,492
3 Claims. (Cl. 180—5)

The present invention is an amphibious motor vehicle, an object of which is to provide a lightweight, durable body, for use on land and water, made of reinforced fiberglass or like suitable material.

Objects of the invention are to provide a body entity, the bottom of which is underslung, for positioning between the vehicle wheels, to provide a waterproof and dirt-proof housing, for that portion of the power transmitting mechanism which is operatively connected to the vehicle wheels; to provide a body entity, the superstructure of which extends laterally, on both sides, to completely overhang the vehicle wheels fore and aft, to, inter alia, limit the depth of penetration of the vehicle in water, mud, etc.; to provide a body entity in which one end of the underslung bottom opens into the power plant compartment in the vehicle superstructure, to permit the power plant to be operatively connected to the power transmission mechanism for the vehicle wheels.

Further objects of the invention are to provide a vehicle, self-contained for land travel, using six or eight wheels, and operable in water with a low power outboard motor of conventional construction; to provide an amphibious vehicle economical to operate on both land and water and adapted for facile movement over terrain covered with brush, vegetation, snow and the like; to provide a six or eight wheel vehicle, all of which wheels are simultaneously operated with resultant advantages, including pulling traction even if some of the wheels are out of contact with the road of travel; to provide a compact power plant and power transmission mechanism, all completely housed in the vehicle entity to provide a buoyant body equipped with oversize pneumatic tires to further insure buoyancy of the vehicle when operated in water; and to provide a single track for all of the wheels on each side of the vehicle, the track including transverse cleats arranged in predetermined spaced relation and completely spanning the width of oversize tires, to increase traction when desired.

Other objects of the invention will be manifest from the following description of the present preferred form of the invention, taken in connection with the accompanying drawings, wherein:

FIG. 1 is a side elevational view of one form of this invention, employing eight wheels powered by a plant housed in the fore part of the vehicle, dotted lines being used to show the hood in a partially open position;

FIG. 2 is a front elevational view of the same;

FIG. 3 is a sectional view, taken on the line 3—3 of FIG. 4, looking in the direction of the arrows;

FIG. 4 is a sectional view, taken on the line 4—4 of FIG. 3, looking in the direction of the arrows;

FIG. 5 is a horizontal sectional view on the line 5—5 of FIG. 3, looking in the direction of the arrows, illustrating to advantage the manner of mounting the power transmission mechanism beneath the floor of the vehicle body;

FIG. 6 is a side elevational view of another form of the invention, employing six wheels, a part of the wheel track being broken away to disclose details;

FIG. 7 is an enlarged longitudinal sectional view of the vehicle shown in FIG. 6, showing a hook-up of the engine power plant, controls, and power transmission mechanism, in operative engagement with the vehicle wheels;

FIG. 8 is a horizontal sectional view of the form of invention illustrated in FIGS. 6 and 7, taken just beneath the vehicle floor, simulating FIG. 5;

FIG. 9 is a vertical sectional view taken on the line 9—9 of FIG. 7, looking in the direction of the arrows, showing to advantage, that part of the power transmission mechanism, interposed between the motor of the power plant and that part of the power transmission mechanism which is in operative connection with the six vehicle wheels;

FIG. 10 is a sectional view taken on the line 10—10 of FIG. 3, looking in the direction of the arrows, showing to advantage the dual motor power plant for the eight wheel vehicle;

FIG. 11 is a view, similar to that of FIG. 10, taken on the line 11—11 of FIG. 7, looking in the direction of the arrows, showing the single motor power plant for the six wheel vehicle;

FIG. 12 is a vertical sectional view on the line 12—12 of FIG. 6, showing the manner of engaging the wheel track with one of the wheel tires; and FIG. 13 is a plan view of one of the cleats used in the make up of the wheel track.

As advantageously illustrated in FIGS. 1 through 4, the invention comprises basically, a body entity, generally designated 20, preferably made of reinforced fiberglass. This entity is composed of a superstructure 21 and an underslung housing 22. The superstructure 21 is cut away, as shown at 23, for easy access and egress of both cargo and passengers. Longitudinally extending seats may be positioned, in the superstructure, as indicated at 24. The seats may also be used as bunks, particularly in case of emergency. The front end of the underslung part 22 of the body opens into a compartment 25 in the superstructure, to provide an uninterrupted open space, beneath the floor 26′ of the body superstructure, extending from the aft wall of the body to its front wall, beyond the floor 27, to provide an underslung housing 26 as advantageously shown in FIGS. 3 and 7. This space communicates with compartment 25, through passageway 28, to conveniently accommodate the vehicle power plant and power transmission mechanism for both the six wheel and eight wheel vehicle. Access to the power plant is through an opening, in the top vehicle, the opening being normally closed by a hood 27 hingedly mounted, as shown at 29. The hood is normally held closed by a releasable bolt 30, and may be removed, at the option of the user, to permit complete access to be gained to any section of the compartment 25. An exhaust port 31 is strategically positioned in the superstructure 21, in communication with said compartment 25.

A series of divided axles 32, shown to advantage in FIGS. 2, 5, 7 and 8, extend transversely through the side walls of housing 22 and bearings 33 equidistantly spaced on and anchored to longitudinally extending bearing bars 34, as shown to advantage in FIGS. 4, 6, 8 and 9. The bars are superimposed on the bottom of housing 22, constructed of suitable material and of a predetermined thickness. The outer end of each axle projects a considerable distance beyond the sides of housing 22, to accommodate wheel 35. Each wheel is equipped with an oversize pneumatic tire 36, the wheel being spaced from housing 22 by spacer washer 37. The power plant for the vehicle is generally designated 38 and may consist of one motor 39, as shown in FIG. 11, or two motors 40, as shown in FIG. 10. One motor is customarily used with the six wheel vehicle, and two motors with the eight wheel vehicle. A motor-supporting platform or base 41 is positioned in the fore part of the vehicle body, above the front axle, and may be vertically adjusted by jack shafts 42 and 42′. The shafts 42 are mounted on a cross bar 43, spanning the forward ends of the longitudinally extending bars 34, to which the cross bar is secured. The shafts 42′ are supported by steel plates 44 secured to the bearings 33 of the front axle.

The motor or motors, as the case may be, are in operative connection with the vehicle wheels, as shown to advantage in FIGS. 3 and 7.

Primarily, power is transmitted from motor fan shaft 45 to a power or drive shaft 46, through a belt 47. The shaft 46 includes a clutch or clutches 48, brake or brakes 49, and gear reduction pulley or pulleys 50. A hand lever 51 controls the gas and brake through wires 52 and 53 respectively. The lever 51 is movably mounted in a guide 54 carried by a housing 55, through which the gas operating wire 52 and the brake control wire 53 passes.

Skeleton supporting frame 56 for the drive shaft, driven shafts and other mechanism hereafter described, is shown to advantage in FIGS. 4 and 9, and includes angular side walls 57 shown to advantage in FIGS. 2 and 7. The side walls are adapted for the reception, at predetermined points, of driven shafts 58 and drive shafts 46. The driven shafts 58 are operated through conventional sprocket chains and gear wheels which need not be here described in detail and which are clearly shown in FIGS. 2 and 7. The lowermost of the driven shafts 58, as shown in the above-referred to views, is in operative engagement with the front divided axles 32. The front axles, in turn, are in operative engagement with the intermediate and rear axles through drive chains 59 and gear wheels 60 as shown in FIG. 3. The manual control lever 51 is moved in one direction for starting the vehicle and in the opposite direction for applying the brakes.

The disk type brakes 49 lock the entire drive of the machine on one side, through cooperation with brake assembly 61. Each side is independently controlled by the motor, brakes, and gear reductions. The clutch and transmission are of the make Salsbury.

The aft end of the body, at or about location 62, is reinforced and adapted for the reception of the bracket of an outboard motor. Furthermore, the flat bottom of the underslung housing 22 may be reinforced if desired, and is slidable along the terrain. The front end of the housing 22 is inclined as advantageously illustrated in FIGS. 6 and 7, to flatten out vegetation, brush or the like, and to facilitate surfacing of the vehicle in deep snow.

To facilitate traction of the vehicle over rough surface terrain and the like, a continuous track 63 is provided for the wheels on each side of the vehicle. The track includes chains and cleats 64, shown to advantage in FIG. 13, the latter extending transversely across the tires, when in use, so as to completely engage the crown of the tire, after the fashion shown in FIG. 12. Preferably, the cleats 64 are intermediately pressed outwardly, as indicated at 65, to increase the purchase of the cleats on the road of travel.

It is of course to be understood that various changes may be made herein, within the scope of the appended claims, and conventional mechanism such as steering assembly, etc., may be employed in any conventional manner commonly used in the art.

In addition, it is to be understood that the motive power may be applied to the rear axles, instead of the front, by the adaptation of conventional mechanism known in the art.

We claim:

1. An amphibious motor vehicle including a hollow buoyant body entity composed of cargo and passenger superstructure and an underslung housing adapted to receive a completely enclosed power transmission mechanism, the housing communicating with an enclosed end of the superstructure, power means for operating the transmission mechanism, a power transfer assembly linking the power means to said transmission mechanism, divided axles mounted in lineal pairs in the underslung housing, wheels operatively connected to the outer ends of the axles, the power transfer assembly including means to permit the wheels on either side of the vehicle to be independently operated.

2. The amphibious motor vehicle of claim 1 with the addition of oversize pneumatic tires mounted on the wheels to supplement the buoyancy of the vehicle.

3. The amphibious motor vehicle of claim 2 wherein the sides of the superstructure extend laterally to overhang the vehicle tires and limit the depth of penetration of the vehicle in water through which it travels.

References Cited by the Examiner

UNITED STATES PATENTS

| | | | |
|---|---|---|---|
| 2,187,658 | 1/40 | Lane et al. | 115—1 |
| 2,306,072 | 12/42 | Messinger | 115—64 |
| 2,400,132 | 5/46 | Porter | 115—1 |
| 2,705,539 | 4/55 | Martin | 180—44 |
| 2,719,044 | 9/55 | Walter | 115—1 X |
| 2,821,949 | 2/58 | Uyehara | 115—1 |
| 2,924,994 | 2/60 | Adee. | |
| 3,052,311 | 9/62 | Leedom | 180—6.66 |
| 3,168,927 | 2/65 | Garner | 180—6.48 |

BENJAMIN HERSH, *Primary Examiner.*

LEO FRIAGLIA, *Examiner.*